US012455283B2

(12) United States Patent
Tullila et al.

(10) Patent No.: US 12,455,283 B2
(45) Date of Patent: Oct. 28, 2025

(54) METHODS FOR SCREENING POLYPEPTIDES CAPABLE OF BINDING SPECIFIC TARGET MOLECULES AND TOOLS RELATED THERETO

(71) Applicant: Teknologian tutkimuskeskus VTT Oy, Espoo (FI)

(72) Inventors: Antti Tullila, Vtt (FI); Tarja Nevanen, Vtt (FI); Henri Arola, Vtt (FI); Heli Nygren, Vtt (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 911 days.

(21) Appl. No.: 17/425,534

(22) PCT Filed: Jan. 28, 2020

(86) PCT No.: PCT/FI2020/050042
§ 371 (c)(1),
(2) Date: Jul. 23, 2021

(87) PCT Pub. No.: WO2020/157381
PCT Pub. Date: Aug. 6, 2020

(65) Prior Publication Data
US 2022/0214336 A1    Jul. 7, 2022

(30) Foreign Application Priority Data
Jan. 29, 2019  (FI) .................................. 20195053

(51) Int. Cl.
*G01N 33/543*    (2006.01)
(52) U.S. Cl.
CPC ........................... *G01N 33/54313* (2013.01)
(58) Field of Classification Search
CPC .............................................. G01N 33/54313
See application file for complete search history.

(56) References Cited

U.S. PATENT DOCUMENTS

| 2006/0035242 A1* | 2/2006 | Michelitsch ........... C07K 14/47 435/6.18 |
| 2010/0009394 A1 | 1/2010 | Guo |
| 2016/0291032 A1* | 10/2016 | Ogawa ............... C12N 15/1037 |
| 2017/0261512 A1 | 9/2017 | Anderson |

FOREIGN PATENT DOCUMENTS

| EP | 2277044 B1 | 6/2015 | |
| WO | WO-9814216 A2 * | 4/1998 | ......... A61K 39/0013 |
| WO | 2001/002554 A2 | 1/2001 | |
| WO | WO-0102554 A2 * | 1/2001 | ......... C12N 15/1037 |
| WO | WO-2004061075 A2 * | 7/2004 | ............. C07K 16/00 |
| WO | WO-2009140242 A1 * | 11/2009 | ........... G01N 33/531 |

OTHER PUBLICATIONS

International Search Report and Written Opinion issued in corresponding International Patent Application No. PCT/FI2020/050042, mailed Apr. 14, 2020, 15 pages.
Search Report for Finnish Patent Application No. 20195053 dated Aug. 28, 2019, 2 pages.
Author Unknown, "Instructions: Pierce MS-Compatible Magnetic IP Kit (Streptavidin)", Thermo Fisher Scientific, 2014, pp. 1-7.
Aqai, Payam et al., "Receptor-based high-throughput screening and identification of estrogens in dietary supplements using bioaffinity liquid chromatography ion mobility mass spectrometry", Analytical and Bioanalytical Chemistry, Nov. 2013, 5 pages, vol. 405, No. 29.
Knoop, Andre et al., "Qualitative identification of growth hormone-releasing hormones in human plasma by means of immunoaffinity purification and LC-HRMS/MS", Analytical and Bioanalytical Chemistry, 2016, pp. 3145-3153, vol. 408, No. 12.
Loveless, Bianca et al., "Structural Characterization and Epitope Mapping of the Glutamic Acid/Alanin-rich Protein from Trypanosoma congolense: defining assembly on the parasite cell surface", The Journal of Biological Chemistry, Jun. 2011, pp. 20658-20665, vol. 286, No. 23.

* cited by examiner

*Primary Examiner* — Janet L Andres
*Assistant Examiner* — Carey Alexander Stuart
(74) *Attorney, Agent, or Firm* — Meunier Carlin & Curfman LLC

(57) ABSTRACT

The present invention relates to the fields of life sciences, polypeptide analysis and polypeptide discovery methods. Also, the present invention concerns detection methods of target molecules in a sample. Specifically, the invention relates to a method of screening polypeptides capable of binding a target molecule and a method of analyzing or pretreating a sample. Also, the present invention relates to a kit for carrying out methods of the present invention as well as to a polypeptide, antibody or antigen binding fragment capable of binding target molecules screened or obtained by the method of the present invention.

23 Claims, 1 Drawing Sheet

METHODS FOR SCREENING POLYPEPTIDES CAPABLE OF BINDING SPECIFIC TARGET MOLECULES AND TOOLS RELATED THERETO

FIELD OF THE INVENTION

The present invention relates to the fields of life sciences, polypeptide analysis and polypeptide discovery methods. Also, the present invention concerns detection methods of target molecules in a sample. Specifically, the invention relates to a method of screening polypeptides capable of binding a target molecule and a method of analyzing or pretreating a sample. Also, the present invention relates to a kit for carrying out methods of the present invention as well as to a polypeptide, antibody or antigen binding fragment capable of binding target molecules screened or obtained by the method of the present invention.

BACKGROUND OF THE INVENTION

Small analytes include e.g. biomarkers for health (hormones, metabolites, neurotransmittors), legal and illegal drugs, food contaminants (antibiotic remnants, pesticides), toxins (e.g. bacterial, fungi, algae origin) and pollutants. Most of the small analytes lack rapid point-of care or in situ immunoassays for their measurement. Currently one major limiting step in the antibody development against most demanding small molecule analytes is the successful synthesis of hapten-protein conjugates for antibody development purposes. All current technologies on the market require this step, and the synthesis is often expensive and laborious. Moreover, the success of conjugation is difficult to validate, increasing the risk of unsuccessful antibody development due to the possible structural changes of the antigen due to the linkering.

Currently antibodies are developed for small analytes by synthesizing a linker to the small analyte for conjugation purposes. The linker containing small analyte is conjugated to the protein and the analyte-protein conjugate is then used for immunization of an animal to obtain poly- and monoclonal antibody antibodies. Alternatively, analyte-protein conjugate is immobilized to a solid surface prior to the antibody development in vitro utilizing antibody libraries. However, only a portion of organic molecules are suitable for linker synthesis. Therefore, most of the small analytes still lack antibody-based diagnostics.

E.g. WO 2001002554 A2 describes methods for selecting interacting molecules, wherein magnetic particles and an automated device comprising a magnetic particle processor are utilized. However, there remains a significant unmet need for a technology, which enables development of polypeptides capable of binding intact, free target molecules including but not limited to small analytes.

BRIEF DESCRIPTION OF THE INVENTION

The difficulties of the prior art concerning screening of small molecule binding polypeptides and the necessity of chemical conjugation of a small target molecule to a carrier protein or to a surface before subsequent screening of binding polypeptides can be overcome by the method present invention.

One object of the present invention is to provide a method for screening or analyzing polypeptides capable of binding target molecules, wherein said method lacks linkering of target molecules. Therefore, unwanted effects of linkers on the structure of target molecules can also be avoided.

Another object of the present invention is to evaluate the binding properties of known and unknown polypeptides against known target molecules. Compared to e.g. ELISA methods for small target molecules, which utilize conjugates, the present invention enables detecting that a polypeptide (e.g. antibody or antigen binding fragment) binds specifically the small molecule of interest. Indeed, the methods and tools of the present invention allow the screening of polypeptides against free and intact molecules. Furthermore, the present invention enables analysis of complexes comprising a polypeptide and a molecule bound thereto as well as analysis of said polypeptide and/or molecule. Still further, the present method opens new possibilities for the analysis of known polypeptides and for the screening and discovery of novel target molecule (e.g. small substance) binding polypeptides.

Further objects of the present invention include production of multiple different polypeptides and studying the possible binding of a mixture comprising said different polypeptides against target molecules. The ability to use a mixture of polypeptides, each with a unique set of amino acids, allows the increase of the throughput in the screening method and enables screening of polypeptide libraries for discovering polypeptides with unique binding properties against specific target molecules such as small substances.

And still further objects of the present invention include a fast study on specificities (cross reactivity) of several positive antibody clones capable of binding target molecules including but not limited to small molecules, metabolites and precursors.

In summary, the present invention now provides methods and tools for the discovery and analysis of binding properties of known and unknown polypeptides against free target molecules (e.g. small molecules), circumventing the need for conjugation of the target molecules to a carrier protein or to a surface prior to polypeptide analysis. Subsequently, the developed method allows the development of novel polypeptides against any targets, especially difficult analytes, including but not limited to small molecules e.g. hormones, neurotransmitters, and toxins.

The method of the present invention allows i) detecting binding of a polypeptide to a target molecule (such as a small target molecule) without conjugate structures, ii) analyzing several different target molecules at the same time, and iii) analyzing several different binding polypeptides at the same time. Compared to the prior art methods, the method of the present invention is easier, simpler, faster and thus also more cost-effective.

No immunization is needed in the present invention and the target molecule doesn't need to be pure and does not need to be fused to any carriers. Compared to the present invention e.g. in immunized phage display and monoclonal antibody development methods target compounds must be immunogenic. Furthermore, in immunized or naïve phage display and monoclonal antibody developments target compounds must be pure and immobilized.

The present invention is based on the idea of combining specific method steps in a surprising way for obtaining a very effective and specific screening and analyzing method.

The present invention relates to a method of screening a polypeptide capable of binding a target molecule, wherein the method comprises i) allowing a capture complex to contact with a polypeptide (e.g. in a liquid comprising a polypeptide) thereby forming a first complex comprising the capture complex and the polypeptide,
ii) allowing the first complex to contact with a sample comprising target molecules thereby forming a second complex comprising the capture complex, the polypeptide, and a target molecule, and
iii) separating the target molecule of the second complex to a solution, or
i) allowing a polypeptide to contact with a target molecule (e.g. in a liquid) thereby forming a first complex comprising the polypeptide and the target molecule,
ii) allowing the first complex to contact with a capture complex thereby forming a second complex comprising the capture complex, the polypeptide, and a target molecule, and
iii) separating the target molecule of the second complex to a solution.

Also, the present invention relates to a method of analyzing or pretreating a sample, wherein the method comprises
i) allowing a capture complex to contact with a polypeptide (e.g. with a liquid comprising a polypeptide) thereby forming a first complex comprising the capture complex and the polypeptide,
ii) allowing the first complex to contact with a target molecule (e.g. a liquid comprising a target molecule) thereby forming a second complex comprising the capture complex, the polypeptide, and a target molecule, and
iii) separating the target molecule of the second complex to a solution, or
i) allowing a polypeptide to contact with a target molecule (e.g. in a liquid) thereby forming a first complex comprising the polypeptide and the target molecule,
ii) allowing the first complex to contact with a capture complex thereby forming a second complex comprising the capture complex, the polypeptide, and a target molecule, and
iii) separating the target molecule of the second complex to a solution.

Still, the present invention relates to a polypeptide, antibody or antigen binding fragment capable of binding target molecules screened or obtained by the method of the present invention.

Still, the present invention relates to a second complex comprising a capture complex bound to a polypeptide bound to a target molecule, wherein optionally the polypeptide is an antibody or an antigen binding fragment and/or optionally the target molecule is a small molecule. For example, said second complex of the present invention can be used for carrying out the method of the present invention.

And still, the present invention relates to a kit comprising
i) a capture complex for binding a polypeptide (and optionally for forming a first complex comprising the capture complex and the polypeptide or a second complex comprising the capture complex, the polypeptide, and a target molecule),
ii) optionally a polypeptide for binding a target molecule (and optionally for forming a first complex comprising the polypeptide and the target molecule or the second complex comprising the capture complex, the polypeptide, and a target molecule), and/or
optionally target molecules (e.g. a sample comprising target molecules) for forming the first or second complex, and
iii) a solution for separating the target molecule of the second complex.

And still furthermore, the present invention relates to a kit for carrying out the method of the present invention, comprising
i) a capture complex for binding a polypeptide (and optionally for forming a first complex comprising the capture complex and the polypeptide or a second complex comprising the capture complex, the polypeptide, and a target molecule),
ii) optionally a polypeptide for binding a target molecule (and optionally for forming a first complex comprising the polypeptide and the target molecule or the second complex comprising the capture complex, the polypeptide, and a target molecule), and/or
optionally target molecules (e.g. a sample comprising target molecules) for forming the first or second complex, and
iii) a solution for separating the target molecule of the second complex.

Other objects, details and advantages of the present invention will become apparent from the following drawings, detailed description and examples.

DETAILED DESCRIPTION OF THE INVENTION

Figure 1:
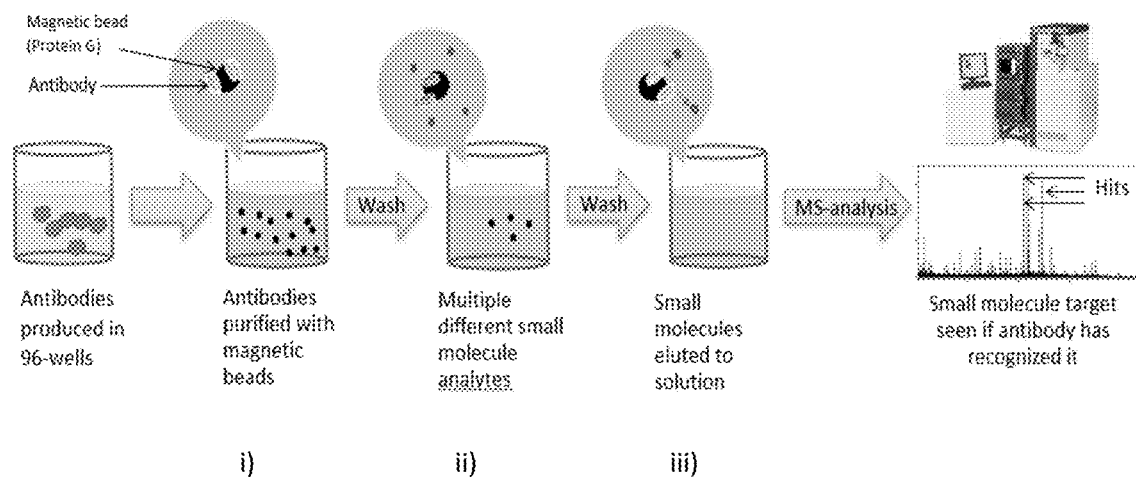
FIG. 1 illustrates the principle and one embodiment of the present invention. In one embodiment of the invention i) polypeptides are bound with capture complexes, optionally followed by a washing step (one or more washings). Then, ii) target molecules are allowed to contact with the formed complex of a capture complex and polypeptide from step i) (e.g. a sample comprising target molecules is added on a complex of a capture complex and polypeptide, or a complex of a capture complex and polypeptide is added to a sample comprising target molecules), optionally followed by a washing step (one or more washings). Furthermore, iii) target molecules bound to polypeptides are separated from the complex comprising a capture complex, polypeptide and target molecule. Thereafter, said separated target molecules are optionally analyzed. In a very specific embodiment polypeptides are produced by a host in culture media (e.g. in microtiter wells), captured to a solid surface by a capture complex comprising e.g. a magnetic bead and protein G complex, and subjected to a solution containing one or multiple known target substances. Optionally a washing step is carried out before a sample containing one or multiple known target molecules is applied on polypeptides captured to a solid phase. Optionally a washing step is carried out after target molecules have been bound by the polypeptides captured to a solid phase. The target molecules are consecutively separated from the bound polypeptides (e.g. with an eluate) to a solution and the solution is optionally analyzed to quantify the amount of separated target substances in the solution (e.g. in the eluate). The presence of target molecules in the solution indicates the binding of screened polypeptides onto the target substance. Optionally the sequence of the discovered polypeptide capable of binding the target molecule can be obtained with standard molecular biology methods, e.g. from the production host used in the polypeptide production.

The principle of one embodiment of the present invention is illustrated in FIG. 1. Indeed, the methods and tools of the present invention comprise a first binding partner (i.e. a capture complex) that is optionally attached to a solid or semisolid surface, a second binding partner (i.e. a polypeptide) that is specifically captured by the first binding partner, and a third binding partner (i.e. a target molecule) that is captured by a second binding partner. In the method step i) a capture complex is allowed to contact with a polypeptide (e.g. with a liquid comprising a polypeptide) thereby forming a first complex. In the method step ii) the first complex is allowed to contact with a sample comprising target molecules thereby forming a second complex. After step ii) the second complex is optionally separated from the unbound binding partners e.g. by immobilization (e.g. attached to a solid or semisolid surface (e.g. by a second binding partner)) or filtration. In the method step iii) the target molecule is released or separated from the second complex.

One embodiment of the present invention comprises a second binding partner (i.e. a polypeptide) that is optionally attached to a solid or semisolid surface, a third binding partner (i.e. a target molecule) that is specifically captured by the second binding partner, and a first binding partner (i.e. a capture complex) that captures a second binding partner. In the method step i) a polypeptide is allowed to contact with a target molecule (e.g. with a liquid comprising a target molecule) thereby forming a first complex (e.g. by specific binding). In the method step ii) the first complex is allowed to contact with a capture complex thereby forming a second complex (e.g. by specific or non-specific binding). After step ii) the second complex is optionally separated from the unbound binding partners e.g. by immobilization (e.g. attached to a solid or semisolid surface (e.g. by a second binding partner)) or filtration. In the method step iii) the target molecule is released or separated from the second complex.

As used herein "a first complex" refers to either a complex comprising a capture complex and a polypeptide (i.e. a complex comprising a first and second binding partner) or a complex comprising a polypeptide and a target molecule (i.e. a complex comprising a second and third binding partner). As used herein "a second complex" refers to a complex comprising a capture complex, a polypeptide, and a target molecule (i.e. a complex comprising a first, second and third binding partner).

A capture complex of the present invention is able to bind specifically a polypeptide and is optionally attached to a solid or semisolid surface. Said capture complex can be attached to any solid or semisolid surface such as a magnetic particle, agarose or plastic. Depending on the polypeptide or the polypeptide library to be screened, the capture complex can be selected from various alternatives. In one embodiment of the invention, e.g. wherein the polypeptide is an antibody or an antigen binding fragment, the capture complex may be selected from the group consisting of protein A, protein G, protein L, and any combination thereof. Proteins A and G are bacterial proteins, in a specific embodiment from *Staphylococcus aureus* and *Streptococcus* species respectively, and they have a high affinity for the Fc region of IgG antibodies from a broad variety of species. In another embodiment of the invention, wherein the polypeptide to be bound comprises a chemical modification, such as biotinylation, the capture complex may be selected from the group consisting of avidin, streptavidin, a mixture thereof and a mutant thereof. In a further embodiment of the invention, wherein the polypeptide to be bound comprises an affinity tag, such as polyhistidine area (e.g. His6), FLAG, Myc or Strep-tag, the capture complex is selected according to the specificity to the affinity tag, e.g. the capture complex may be selected from the group consisting of immobilized metal affinity chromatography (e.g. Ni-IMAC), iminodiacetic acid (e.g. Ni-IDA), nitrilotriacetic acid (e.g. Ni-NTA), tris(carboxymethyl)ethylenediamine (e.g. Ni-TED), monoclonal anti-FLAG-antibody, monoclonal anti-Myc antibody, an engineered streptavidin, monoclonal anti-Strep antibody and any combination thereof. Examples of metals, which can be used for immobilization of polypeptides (e.g. His tagged polypeptides) by the capture complex include but are not limited to Cu, Ni, Co, and Zn. In a further embodiment of the invention, wherein the polypeptide to be bound is a designed polypeptide, the capture complex may be selected from molecules interacting with said designed polypeptides (e.g. hydrophobin (HFB), hydrophobic peptides). A capture complex can actually be any polypeptide or molecule, which is able to capture a polypeptide e.g. in a solution. One or more capture complexes may be used in the method of the present invention.

In one embodiment of the invention the capture complex is attached to a magnetic bead, plastic bead or any surface or material (e.g. optionally functionalized). Magnetic beads combined e.g. with native protein A or protein G can be used to simplify the enrichment of polypeptides in the method of the present invention. In some embodiments streptavidin magnetic beads are used to isolate biotinylated molecules. As used herein "a magnetic bead" refers to an iron oxide particle encapsulated or glued together with polymers. The magnetic beads range from 5 nm up to 4.5 μm and exhibit superparamagnetism in the presence of an externally applied magnetic field.

A polypeptide that is bound by a capture complex in the method of the present invention can be an antibody e.g. belonging to any of the classes IgG, IgM, IgE, IgA or IgD, or an antigen binding fragment such as a Fab fragment (fragment antigen binding) or scFv (single chain Fv). In some embodiments the polypeptide comprises or consists of the variable and first constant domains of an antibody or the variable domains. The antibody or an antigen binding fragment capable of binding a target molecule may optionally comprise an additional structure or construct that allows the specific capture by the capture complex (e.g. a peptide tag such as His6 tag for immobilization). Alternatively, a polypeptide that is bound by a capture complex may be any other polypeptide than an antibody or an antigen binding fragment, and may optionally comprise a structure or construct that allows the specific capture by the capture complex (e.g. affibody or antidin molecules, ankyrin repeat proteins, green fluorescent proteins or aptamers).

Herein, the terms "polypeptide" and "protein" are used interchangeably to refer to polymers of amino acids of any length.

As used herein "antibodies" refer to polypeptides or proteins produced by immune cells or by recombinant techniques in response to antigens. An antibody is an immunoglobulin molecule and it can belong to any of classes IgG, IgM, IgE, IgA or IgD; IgG and IgM being the most frequently used. As used herein "binding polypeptides" refer to polypeptides which bind to antigens i.e. target molecules of interest. In some embodiments binding polypeptides may inhibit or suppress the function of antigens (polypeptides, proteins, polysaccharides) or haptens of interest. Antibodies or antigen binding fragments are the most widely used binding molecules in rapid diagnostics e.g. for small molecules.

As used herein "an antibody or antigen binding fragment" refers to any antibody or a fragment thereof which is capable to bind a target molecule (e.g. by specific binding). The term includes e.g. any fragments or single chain antibodies (e.g. Fab, scFv) having the desired biological activities. As an example any complementarity determining regions, heavy chain variable regions, light chain variable regions and any combinations thereof are included within the scope of "antigen binding fragments". As used in this context "a fragment" refers to any part of a polypeptide or protein.

In antibodies variable loops between β-strands, three on each light ($V_L$) and heavy ($V_H$) chain, are responsible for binding to the antigen. These loops are referred to as the complementarity determining regions (CDRs). As used herein, the term "hypervariable region" refers to the amino acid residues of an antibody or fragment thereof which are responsible for antigen binding. As used herein, the terms "heavy chain variable domain," "$V_H$ domain" and/or "$V_H$" are used interchangeably and reference the hypervariable region (encompassing both the CDR and framework domains) of the heavy chain of an antibody; the terms "light chain variable domain," "$V_L$ domain" and/or "$V_L$" are used interchangeably and reference the hypervariable region (encompassing both the CDR and framework domains) of the heavy chain of an antibody.

As used herein "a Fab fragment" (fragment antigen-binding) refers to a region of an antibody consisting of the variable and constant domains of an immunoglobulin light chain covalently attached by a disulfide bridge to the variable and first constant domain of an immunoglobulin heavy chain. "Fv" (variable domain) refers to the variable regions of the immunoglobulin molecule that are responsible for the ligand binding. "A single-chain Fv fragment (scFv)" refers to a fragment comprising the $V_H$ and the $V_L$ domains (variable regions) of the immunoglobulin molecule connected by a linker in a single polypeptide synthesized from a single mRNA molecule.

In one embodiment of the invention the antibody or antigen binding fragment comprises constant regions, which correspond to human or non-human (e.g. rodent, mouse, rabbit, camel, hen or shark) constant regions. In another embodiment at least part of the variable regions of the antibody or antigen binding fragment correspond to human or non-human variable regions. In another embodiment the antibody or antigen binding fragment comprises amino acids of one or more (e.g. at least two, at least three, at least four, at least five or at least six) complementarity determining regions (CDRs).

Polypeptides with affinity and/or specificity, or high affinity and/or specificity against one or more target molecules can be found by the method and tools of the present invention. As used herein "specificity" refers to a degree revealing how the polypeptide is able to detect a target molecule of interest. Depending on a polypeptide in question specificity and/or affinity values can be measured e.g. by Biacore T200 or any other suitable sensor. Binding of polypeptides to one or more target molecules can be specific or non-specific. In one embodiment of the invention the binding is specific.

A polypeptide to be bound with a target molecule in the method of the present invention can be produced either in the method of the present invention or before said method. In one embodiment of the invention the method further comprises production of a polypeptide capable of binding the target molecule. In one embodiment the method further comprises in vitro production of a polypeptide or growing a cell or clone under conditions permitting production of a polypeptide for step i), optionally in the same well, tube, vial or vessel, wherein steps i)-iii) are carried out.

E.g. eukaryotic, prokaryotic, animal, human, mammalian, bacterial, yeast, filamentous fungal, plant and insect cells are widely used expression systems for the production of polypeptides (e.g. recombinant antibodies) e.g. in vitro. In one embodiment the cell is selected from the group consisting of a bacteria cell, *Escherichia coli* cell, eukaryotic cell, insect cell, yeast cell, fungal cell, filamentous fungal cell, and mold cell, or the clone is selected from the group consisting of a clone of bacterial cells, *Escherichia coli* cells, eukaryotic cells, insect cells, yeast cells, fungal cells, filamentous fungal cells, and mold cells. The polypeptides utilized in the present invention can be developed e.g. by using genetically engineered genes expressed in an in vitro cell lines or by traditional hybridoma based technologies. In some embodiments of the invention the method of screening a polypeptide comprises introducing an expression vector comprising the nucleic acid molecule encoding the polypeptide of the present invention into a host cell and growing the cell under conditions permitting production of the polypeptide. In a specific embodiment a production host secretes the polypeptide into culture supernatant from which said polypeptide may optionally be captured e.g. by using an immobilized capture complex.

In summary, the polypeptides may be produced with any methods known to a person skilled in the art, e.g. the polypeptides may be produced synthetically. All techniques for producing polypeptides are known to a person skilled in the art and are described in practical manuals and handbooks for laboratory molecular techniques.

In one embodiment the method of the present invention is a screening method of recombinant polypeptides or polypeptide libraries against target molecules. The polypeptide library is conveniently an expression library, e.g. a phage display library. The general principle of the display recombinant polypeptide libraries is that they present the binding polypeptide as a fusion protein on the surface, which may be the surface of a microbial cell such as a yeast or bacterial cell, or a bacteriophage. The display recombinant library can also be a display library, wherein stable complexes of polypeptides are produced in an in vitro expression system. Phage display is the most frequently used display method for antibody libraries.

The antibodies or antigen binding fragments can be conveniently discovered from polypeptide libraries.

In a specific embodiment of the invention screened polypeptides, such as recombinant antibodies, are produced in culture media (e.g. in microtiter wells), optionally captured to a solid surface, and subjected to a sample comprising one or multiple known target substances. Optionally a washing step is carried out before said sample is applied on polypeptides. Optionally a washing step is carried out after the target molecule is allowed to contact with polypeptides, e.g. before target molecules are separated from polypeptides to a solution.

In one embodiment capture complexes combined with magnetic beads are added to a liquid comprising polypeptides to be used in the method of the present invention.

In one embodiment of the invention the first complex comprising a capture complex and a polypeptide is captured to a solid surface before allowing the first complex to contact with a sample comprising target molecules (i.e. before step ii) of the invention).

In one embodiment of the invention the first complex comprising a polypeptide and a target molecule is captured to a solid surface before allowing the first complex to contact with a capture complex (i.e. before step ii) of the invention).

A target molecule can be characterized by its ability to bind to a polypeptide, e.g. an antibody, an antibody's variable Fab region or antigen binding fragment. As used herein "a target molecule" is a molecule that is screened for the ability to form a complex with a polypeptide e.g. an antibody or an antigen binding fragment. In a specific embodiment "a target molecule" is a molecule that is able to form a complex with a polypeptide.

A target molecule is one substance or a mixture of substances which interactions against polypeptides are studied in the method of the present invention. The polypeptides are either able or unable to naturally recognize target molecules. In the case where a polypeptide binds to a target molecule, the second complex containing a capture complex, polypeptide and target molecule (i.e. a first, second and third binding partner, respectively) is formed. In the present invention the bound target molecules are separated (e.g. eluted) from the bound polypeptides (e.g. by an eluate) to a solution and the solution is optionally analyzed to quantify the amount of target molecules in the solution (e.g. the eluate). The target molecule is released or separated (e.g. eluted) from the second complex e.g. by a selected eluate such as a solvent including methanol or ethanol, or with high or low pH conditions. In one embodiment of the invention the solution is selected from the group consisting of methanol, ethanol and acetonitrile, and any combination thereof, and any water solution thereof.

In one embodiment of the invention, after a target molecule has been released or separated from a second complex to a solution, a first complex comprising the capture complex and polypeptide is collected from the solution. In a very specific embodiment, the first complex is collected from the solution before analyzing the target molecule separated to the solution.

In one embodiment of the invention the method of screening a polypeptide or analyzing or pretreating a sample further comprises analyzing the target molecule separated to the solution. The presence or absence or amount of released target molecules in the solution can then be verified for instance with mass spectrometry methods. In a specific embodiment said analyzing is carried out by a mass spectrometer. Other suitable methods include any suitable analyzing methods known in the art such as detection methods including enzymatic assays, immunological detection methods, fluorescent methods, any instrumental analytical method e.g. sensitive (enough) for small size molecules, and any combinations thereof. The presence of target molecules in the solution indicates the binding of a screened polypeptide onto a target substance. Target molecule concentrations in the solution indicate that one or multiple polypeptides were able to specifically recognize a target molecule or molecules. In turn, low concentrations or absence of target molecules in the solution indicate that none of the polypeptides had a structure that is able to bind a target molecule.

In one embodiment of the invention a target molecule is of any size or structure, optionally detectable with any detection tools or methods, such as mass spectrometry instruments, detection methods including enzymatic assays, immunological detection methods, fluorescent methods, any instrumental analytical method e.g. sensitive enough for small size molecules, and any combinations thereof. In one embodiment the target molecule is selected from the group including but not limited to neurotransmitters, hormones, vitamins, metabolites, toxins, mycotoxins, bacterial toxins, pesticides, herbicides, antibacterial compounds, antibiotics, marine toxins, flame retardants, biocides, halogenated compounds, endocrine disturbing compounds, pharmaceuticals, illegal and design drugs of abuse. In another embodiment the target molecule is an oligopeptide, polypeptide, oligonucleotide, polynucleotide, oligosaccharide or polysaccharide. In the screening or analyzing methods of the present invention the target molecules do not need to be chemically modified. In one embodiment the method of the present invention does not comprise modification of the target molecule, e.g. use of a linker is not needed.

In one embodiment of the invention the target molecule is a small molecule, e.g. an organic small molecule. As used herein "a small molecule" refers to a molecule having a low molecular weight 2000 g/mol or less, 1900 g/mol or less, 1800 g/mol or less, 1700 g/mol or less, 1600 g/mol or less, 1500 g/mol or less, 1400 g/mol or less, 1300 g/mol or less, 1200 g/mol or less, 1100 g/mol or less, 1000 g/mol or less, 900 g/mol or less, 800 g/mol or less, 700 g/mol or less, 600 g/mol or less, or 500 g/mol or less, e.g. a molecule having a molecular weight below 1500 g/mol or below 1000 g/mol, or e.g. between 100-2000 g/mol, 100-1500 g/mol, 100-1000 g/mol, 200-2000 g/mol, 200-15000 g/mol, 200-1000 g/mol, 300-2000 g/mol, 300-1500 g/mol, or 300-1000 g/mol.

In one embodiment of the invention one or more washing steps are carried out after allowing a capture complex to contact with a polypeptide, e.g. in a liquid, (i.e. after step i)), after allowing a polypeptide to contact with a target molecule (i.e. after step i)), or after capturing the first complex for removing unbound polypeptides and/or target molecules, and/or one or more washing steps are carried out after step ii) for removing unbound target molecules or other binding partners. Alternatively or in addition to the washing steps already mentioned in this paragraph, any other optional washing step can be carried out in the method of the present invention. A washing step or steps of the present invention may be carried out with any wash buffer known to a person skilled in the art including but not limited to phosphate buffered saline (PBS), Tris-HCl buffered saline (TBS), 2-(N-morpholino)ethanesulfonic acid (MES), 4-(2-hydroxyethyl)-1-piperazineethanesulfonic acid (HEPES), PBS supplemented with Tween 20, TBS supplemented with Tween 20, and the mixture of Tris-HCl, NaCl, and Tween 20.

In one embodiment of the invention the method of screening a polypeptide or analyzing or pretreating a sample further comprises determining whether a first or second complex has been formed, e.g. before separating the target molecule of the second complex to a solution. Detectable labels such as magnetic beads (i.e. magnetic labels), radioisotopes or fluorescent moieties present in one or more parts of a first or second complex of the present invention may be utilized in said determining step. E.g. the presence of first or second complexes of the invention may be determined by detecting magnetic beads by a magnetic reader (magnetometer) revealing the quantity of said complexes in the liquid and/or sample.

In one embodiment the method of the present invention further comprises recovering and/or determining the polypeptide capable of binding the target molecule present in a first or second complex. As an example, elution of a polypeptide from a first or second complex of the invention can be done by using e.g. an acidic buffer (pH 1-3), alkaline elution, temperature elution, competitive elution, or a buffer containing denaturants e.g. urea. Recovery of polypeptides includes but is not limited to any methods known to a person skilled in the art such as heat or chemical treatments, sonication, denaturing, isolation, precipitation, purification, washing steps, chromatography methods, and any combination thereof. Determining a polypeptide includes any quantitative, qualitative, and semi-qualitative determination. Structural (primary, secondary, tertiary, quaternary) and/or functional properties of a polypeptide or protein may further be studied. Optionally the sequence of the discovered binding polypeptide can be obtained with standard molecular biology methods, e.g. from the production host used in the polypeptide production.

In a specific embodiment of the invention, one or more steps of the method, e.g. all method steps, are repeated once, twice or several times.

In one embodiment of the invention at least steps i)-iii), (i.e. i) allowing a capture complex to contact with a polypeptide or allowing a polypeptide to contact with a target molecule thereby forming a first complex, ii) allowing the first complex to contact with a sample comprising target molecules or with a capture complex, respectively, thereby forming a second complex, and iii) separating the target molecule of the second complex to a solution) are carried out in at least one well, multiwell plate, tube, vial, vessel, column or any combination thereof.

In another embodiment of the invention, first and/or second complexes are formed in one or more wells, multiwell plates, tubes, vials, vessels, columns or any combination thereof.

In a specific embodiment the capture complex(es) or target molecule(s) is(are) allowed to contact with 1-1000, 1-100, 1-50, 1-25, 1-10 or 1-5 polypeptides, cells or clones in one well, tube, vial, column or vessel. Said polypeptides are either same polypeptides or 1-1000, 1-100 or 1-50 different polypeptides. E.g. microtiter plates enable simultaneous or consecutive tests with more than 100 or more than 1000 clones or polypeptides, such as $10^7$ clones or polypeptides (e.g. in 96-microtiter plates). Moreover, the present invention allows screening of multiple target molecules simultaneously. In one embodiment there are 1-1000, 1-100, 1-50, 1-25, 1-10 or 1-5 different target molecules present in a sample to be studied or analyzed (e.g. in one or several wells, tubes, vials, columns or vessels). Thus, several target molecules, such as from 1-5, 1-10, 1-25, 1-50, 1-100, 1-1000, more than 10, more than 50, e.g. at least 100, can be screened at the same time in a single or several methods of the present invention.

Indeed, the technology of the present invention allows high-throughput screening of different polypeptide libraries against target molecules, e.g. (recombinant) antibody libraries against small molecule targets. Indeed, the present invention enables development of polypeptides (e.g. antibodies or antigen binding fragments) for intact target molecules in a high-throughput manner. On the other hand, the present invention allows high-throughput analyzing methods of samples comprising target molecules by utilizing capture complexes and polypeptides capable of binding said target molecules. In one embodiment the method of the present invention is a high-throughput method. As used herein "a high-throughput method" refers to a method, wherein e.g. liquid handling devices and/or sensitive detectors are used to quickly conduct even up to thousands or millions of tests, wherein specifically complexes of a capture complex, polypeptide and target molecule, are formed.

In a specific embodiment the method of the present invention comprises the following steps:
production of polypeptide or antibody mixtures from a polypeptide library (e.g. an antibody library) in a microtiter plate (e.g. in a 96-well microtiter plate),
optionally purifying the polypeptides or antibodies (e.g. with magnetic beads) and transferring to new microtiter plates,
allowing a capture complex to contact with a polypeptide thereby forming a first complex comprising the capture complex and the polypeptide,
allowing the first complex to contact with a sample comprising multiple different target molecules thereby forming a second complex comprising the capture complex, the polypeptide, and a target molecule,
separating the target molecules from the second complexes (e.g. comprising magnetic beads) to a solution,
optionally subjecting the separated target molecules to a mass spectrometry analysis or any other instrumental analytical method e.g. sensitive for small size molecules, and
optionally purifying the polypeptides capable of binding the target molecules from said solution or from polypeptide mixtures from the library, and
optionally repeating one or more of the method steps.

In another specific embodiment the method of the present invention comprises the following steps:
production of polypeptide or antibody mixtures from a polypeptide library (e.g. an antibody library) in a microtiter plate (e.g. in a 96-well microtiter plate),
optionally purifying the polypeptides or antibodies (e.g. with magnetic beads) and transferring to new microtiter plates,
allowing a polypeptide to contact with a sample comprising multiple different target molecules forming a first complex comprising the polypeptide and the target molecule,
allowing the first complex to contact with a capture complex thereby forming a second complex comprising the capture complex, the polypeptide, and the target molecule,
separating the target molecules from the second complexes (e.g. comprising magnetic beads) to a solution,
optionally subjecting the separated target molecules to a mass spectrometry analysis or any other instrumental analytical method e.g. sensitive for small size molecules, and
optionally purifying the polypeptides capable of binding the target molecules from said solution or from polypeptide mixtures from the library, and
optionally repeating one or more of the method steps.

After potential binding polypeptides have been found e.g. in specific wells utilized in the present invention, in vitro productions, cells or clones from these specific wells can be plated and single in vitro productions, cells or clones can be screened (with the present method) to find the single binding polypeptide production, cell or clone. In one embodiment the present invention is able to distinguish e.g. which microtiter well had a polypeptide that binds to its target molecule.

In another specific embodiment polypeptides are produced by bacterial (e.g. E. coli) cells e.g. as recombinant antibody fragments in 96-well microtiter plates. Each well can comprise multiple E. coli clones, each producing different polypeptide. The produced polypeptides are purified with affinity capture (e.g. protein G) e.g. by utilizing magnetic beads and automation (e.g. KingFisher, Thermo Scientific). The beads holding purified antibodies are subsequently immersed into solution where there are multiple different target molecules (e.g. small target molecule) dissolved. In a specific embodiment e.g. purified, magnetic bead attached (recombinant) polypeptides are subjected to a solution mixture of 1-1000 different target molecules. Target molecules are optionally captured by magnetic bead immobilized polypeptides, and non-binding target molecules are optionally washed away. Bound target molecules are eluted to an eluent such as methanol and the eluent is analyzed with MS-methods to identify the presence of target molecules. If a target molecule is found from the eluent, it indicates that one or more magnetic bead purified polypeptides had bound to the target molecule. Once the wells harboring potential target molecule binding polypeptides are found, E. coli stocks from these wells are plated and single clones are screened with the present method to find the single binding polypeptide clone.

The present invention also concerns a kit e.g. for carrying out the method of the present invention, comprising
i) a capture complex for binding a polypeptide and for forming a first complex comprising the capture complex and the polypeptide or a second complex comprising the capture complex, the polypeptide, and a target molecule,
ii) optionally a polypeptide for binding a target molecule and for forming a first complex comprising the polypeptide and the target molecule or the second complex comprising the capture complex, the polypeptide, and a target molecule, and/or
optionally target molecules for forming the first or second complex, and
iii) a solution for separating the target molecule of the second complex.

In one embodiment of the invention the kit further comprises one or more reagents for performing the method of the present invention, and optionally instructions for performing said method, analyzing the target molecule and/or carrying out a MS analysis or any instrumental analytical method e.g. sensitive for small size molecules. In one embodiment the test kit comprises one or several reagents selected from the group consisting of reaction solutions, buffers, eluents (e.g. a solvent comprising methanol or ethanol or a combination thereof), buffers, pH regulators, washing solutions (e.g. phosphate buffered saline (PBS), Tris-HCl buffered saline (TBS), 2-(N-morpholino)ethanesulfonic acid (MES), 4-(2-hydroxyethyl)-1-piperazineethanesulfonic acid (HEPES), PBS supplemented with Tween 20, TBS supplemented with Tween 20, and the mixture of Tris-HCl, NaCl, and Tween 20) and detection means (e.g. selected from the group consisting of labels, magnetic beads, radioisotopes and fluorescent moieties). In another embodiment, the test kit also comprises one or more wells, multi-well plates, tubes, vials, vessels, columns or any combination thereof for carrying out the method of the invention. Instructions for performing said method or carrying out a MS analysis or other instrumental analytical method e.g. sensitive for small size molecules may include e.g. instructions how to use the reagents of the kit and in which method steps and/or how to determine concentration(s) of target molecules in a sample.

Optionally control samples (e.g. positive or negative control samples) or samples revealing levels of specific target molecules may also be utilized in the present invention. Also, a quality control may optionally be comprised within the kit.

The performance of the method or assay may be such that at least part of the reagents and/or polypeptides are pre-dried in the well of a microtiter plate and a dilution series of at least one sample is to be added to the well. In such a case the test kit may comprise multiple reagent pairs physically separated from each other e.g. in the form of a microarray, whereby multiple target molecules may be tested simultaneously from a sample. In one embodiment the kit of the present invention is suitable for high through-put assays for large number of samples.

The sample used in the method or kit of the invention may be any sample comprising known or unknown target molecules. In one embodiment of the invention the sample is a biological, environmental, material, raw material or food sample, or a sample of a subject. As an example, environmental samples may include but are not limited to samples of water (groundwater, well water, drinking water, water of a lake, sea, river or stream, rain water, waste water), soil, sediment, plants, moss, lichen. Food samples include any samples of products or liquids to be eaten or drunk. In one embodiment of the invention a subject is a human or an animal, a child, an adolescent or an adult. Also, any animal, such as a pet, domestic animal or production animal, may be a subject of the present invention. The sample obtained from a subject includes but is not limited to a sample of blood, serum, plasma, urine, tears, sweat, feces, biopsy or tissue. In one embodiment of the invention the sample is in a liquid or semisolid form.

The present invention also relates to a polypeptide, antibody or antigen binding fragment capable of specifically binding one or more target molecules screened or obtained by the method of the present invention.

It will be obvious to a person skilled in the art that, as the technology advances, the inventive concept can be implemented in various ways. The invention and its embodiments are not limited to the examples described below but may vary within the scope of the claims.

EXAMPLES

Example 1

Single Antibody Binding Analysis

Four recombinant antibody clones in Fab-fragment format in pKKtac production vectors and in BL21 E. coli production host were each picked in duplicates into Masterblock Deepwell 96 Plates (Greiner Bio-One) with 1 mL of TB based autoinduction media (Novagen, 71491-5) with 100 µg/ml carbenicillin using Genetix QPix robotic colony picker and grown at 700 rpm for 48 hours at +30'C. Plates were centrifuged at 3400 g for 10 minutes and 500 µL of supernatants were transferred into KingFisher Deepwell 96 Plate (Fisher Scientific, Cat. 95040450) and mixed with 500 µl of PBST (15 mM sodium phosphate pH 7.3, 150 mM NaCl, 0.05% Tween20 (v/v)) containing 4 mg/L DNase and 500 µM $MgSO_4$. Plate was transferred to magnetic particle processor (King Fisher 96, Thermo Scientific). 20 µl of Protein G coated magnetic beads (Millipore PureProteome, Cat. LSKMAGG10) were transformed into diluted supernatants and mixed in magnetic particle processor for 1 hour. Magnetic beads with Protein G captured recombinant antibodies were subsequently washed in magnetic bead processor for 10 seconds in 300 µL PBST and transferred to 1% DMSO (v/v) PBST containing 1 µM of target molecules mycophenolic acid, L-thyroxine, Ochratoxin A, Aflatoxin B1 and HT2-toxin. After 30 minutes of incubation with constant shaking beads were washed as above and transferred to 100 µl of 100% methanol containing 40 ng/mL Zearalane, in which Zearalane serves as a normalization standard for MS-analyses. Beads were mixed in methanol for 30 minutes to remove analytes (i.e. target molecules) from bound antibodies. Magnetic beads were then collected and 100% methanol solution now containing analytes were diluted 1:1 in double distilled water (DDIW).

The analyses were performed by a UPLC-MS/MS system consisting of an Acquity UPLC (Waters, Milford, MA) instrument equipped with a sample organizer and coupled to a Xevo TQ-S tandem quadrupole mass spectrometer (Waters, Milford, MA). A short analytical column, an Acquity UPLC BEH C18, 2.1 mm×30 mm (1.7 µm particle size) and gradient elution with water and methanol containing 0.1% formic acid and 5 mM ammonium acetate were utilized for a fast chromatographic separation of the target molecules. Mass spectrometry was performed using electrospray ionization (ESI) in positive ion mode and the MS parameters for each SRM were optimized. The data was collected and processed using TargetLynx software (Waters). Analytes were quantified by internal standard method and the quantitation limits were in the pg/ml to ng/ml range depending on compound. The more detailed MS parameters are presented in Table 2.

Results of the analysis are shown in Table 1.

TABLE 1

The method of the present invention is able to reveal antibody fragments, which bind target molecules of interest.

| Fab fragment antibody | AFB1 ng/mL | MPA ng/ML | HT-2 ng/ML | OTA ng/ML | T4 ng/ML |
|---|---|---|---|---|---|
| anti-aflatoxin B1 | 5.72 | 0.39 | 0.10 | 1.04 | 1.86 |
| anti-aflatoxin B1 | 6.84 | 0.40 | 0.10 | 1.05 | 1.33 |
| anti-mycophenolic acid | 0.31 | 6.23 | 0.10 | 0.86 | 1.36 |
| anti-mycophenolic acid | 0.34 | 6.48 | 0.10 | 0.89 | 1.37 |
| anti-Ochratoxin B | 0.34 | 0.36 | 0.10 | 15.40 | 1.59 |
| anti-Ochratoxin B | 0.38 | 0.39 | 0.10 | 16.80 | 1.91 |
| anti-L-thyroxine | 0.40 | 0.40 | 0.10 | 1.23 | 28.10 |
| anti-L-thyroxine | 0.44 | 0.43 | 0.10 | 1.31 | 27.90 |

TABLE 2

SRMs (precursor and product ions), cone voltages, collision energies and retention times of the target molecules and the internal standard (ISTD).

| Analyte | Abbreviation | Precursor ion (m/z) | Product ion (m/z) | Cone voltage (V) | Collision energy (V) | rt (min) |
|---|---|---|---|---|---|---|
| Aflatoxin B1 | AFB1 | 313.1 | 241.1 | 36 | 36 | 0.70 |
| HT-2 toxin | HT-2 | 442.2 | 215.2 | 20 | 12 | 1.10 |
| Mycophenolic acid | MPA | 321.1 | 207.0 | 18 | 20 | 1.20 |
| L-Thyroxine | T4 | 777.7 | 323.7 | 64 | 56 | 1.38 |
| Ochratoxin A | OTA | 404.1 | 239.0 | 32 | 22 | 1.44 |
| 25-Hydroxyvitamin D | 25(OH)D (=ISTD) | 401.4 | 365.3 | 20 | 12 | 2.46 |

Example 2

Analysis of a Mixture of Antibody Clones
Antibody Library Construction

Three mice were immunized with multi-immunization approach and primary libraries created as described in Tullila & Nevanen (Int J Mol Sci 2017 May 31; 18: 1169-. pii: E1169. doi: 10.3390/ijms18061169). Briefly, total of 16 different haptens were conjugated to a carrier protein using EDC/s-NHS chemistry following the instructions of the manufacturer (Thermo Fisher Scientific). Haptens were retinoic acid, docosahexaenoic acid, triiodothyronine, L-thyroxine, perfluorononanoic acid (a kind gift from Pierangelo Metrangolo, University of Milano), homovanillic acid, 5-hiaa, HT-2 toxin, ketoprofen, ibuprofen, folinic acid, betulinic acid (a kind gift from Jari Ylikauhaluoma, University of Helsinki), folic acid, mycophenolic acid, fumonisin B1 and Ochratoxin B (all acquired from Sigma-Aldrich if not otherwise noted). Chosen carrier protein was BlueCarrier® (Sigma-Aldrich). One mouse was immunized with seven, second with four and third with five different haptenBlueCarrier®-conjugates, respectively. Separate recombinant antibody mouse Fab libraries were created from all three spleens as described in Tullila & Nevanen (Int J Mol Sci 2017 May 31; 18: 1169-. pii: E1169. doi: 10.3390/ijms18061169). 1 µg of recombinant Fab fragment libraries were mixed with 100 µL of electrocompetent E. coli cells (Agilent Technologies) and electroporation was performed with 2.5 kV electric pulse by MicroPulser™ Electroporator (Bio-Rad). 3 mL of prewarmed SOC (0.5% yeast extract, 2% tryptone, 1 mM NaCl, 2.5 mM KCl, 10 mM $MgCl_2$, 10 mM $MgSO_4$, and 0.4% (w/v) glucose) was added and bacteria were cultivated in +37° C. for 1 hour with 225 rpm shaking. Volumes were raised to 10 mL with SB (2% yeast extract, 3% tryptone, 1% 3-(N-morpholino)propane sulfonic acid (MOPS), pH 7) containing 20 µg/mL carbenicillin (Sigma-Aldrich) and cultivated for additional 1 hour. Carbenicillin concentration was increased to 50 µg/mL, cultivated for 1 hour as above and volume raised to 100 mL with SB supplemented with 50 µg/mL carbenicillin, 10 µg/mL tetracycline and 1% (w/v) glucose. Cultures were cultivated overnight at +37° C. with shaking and on the following day primary recombinant antibody library plasmids were isolated with Plasmid Maxi Kit (QIAGEN®) according to manufacturer's instructions. Obtained plasmid concentrations were measured with Nanodrop 2000C (Thermo Scientific). 75-90 µg of plasmids harbouring light and heavy chains of immunized repertoire were digested with SfiI and NotI restriction enzymes (both from New England Biolabs) following manufacturer's instructions. Digestion mixtures were run on 1% (w/v) agarose gel (SeaKem® LE Agarose (Lonza)) electrophoresis and separated heavy chains and vector that harboured light chain repertoire were isolated using NucleoSpin® Gel and PCR Clean-up kit (Macherey-Nagel) according to manufacturer's instructions. In total of six chain-shuffling ligations were performed by ligating 1 µg of each three vector to 500 ng of heavy chain inserts in 100 µL reaction volume using T4 ligase (Promega) according to manufacturer's instructions. Ligations were carried out overnight at +16° C. and on the following day kept 15 minutes on +65° C. prior to DNA precipitation. 10 µL of 3 M sodium acetate, 10 µg glycogen and 257 µL of 94% ethanol were added to ligation mixtures and precipitation was carried out in −20° C. for 15 minutes after which the mixtures were centrifuged at 20,000×g (Eppendorf Centrifuge 5430R) for 75 min in +4° C. Liquids were discarded and 400 µL of pre-cooled 70% ethanol in water was added to precipitates. Precipitants were centrifuged at 20,000×g for 25 min and liquids were again discarded. DNA-pellets were each dissolved in 1 mM $MgCl_2$-DDIW. Dissolved ligation mixtures were transformed to XL1-blue electrocompetent cells (Agilent Technologies) and final chain-shuffled Fab recombinant antibody libraries were isolated with Plasmid Maxi Kit (QIAGEN®) as above.

Library Transformation with Heat Shock and Plating

1 µg of combined chain-shuffled recombinant antibody library (6 sub-libraries) in pKKtac plasmid was added on 50 µl of BL-21 cells (stored in −80° C. and thawed on ice) and incubated for 30 min on ice. The plasmids were transformed into BL21 cells by 42° C. heat shock for 45 seconds and after the cells were stabilised on ice for 2 min. 950 µl of pre-warmed (37° C.) SOC medium was added (SOB+200 µl of 20% glucose). The cells were cultivated for 1 hour in 37° C. with rotation. 500 µl of transformed cells were plated on large LB-ampicillin (100 µg/ml) plates.

Colony Picking and Antibody Production 9 single BL-21 colonies transformed with Fab library in pKKtac production vector and one colony containing either anti-mycophenolic acid, anti-L-thyroxine, anti-Ochratoxin A or anti-Aflatoxin B1 in same strain and production vector picked to Nunc 96 microwell plate (Thermo Scientific) including 100 µl of Overnight Express™ Instant TB Medium (Novagen) with 100 µg/ml carbenicillin using Genetix QPix robotic colony picker. 20 µL of cultures were subsequently transferred in duplicates to 1 mL of Overnight Express™ Instant TB Medium and grown at 700 rpm for 48 hours at +30'C.

Antibody Mixture Analysis

Plates were centrifuged at 3400 g for 10 minutes and 500 µL of supernatants were transferred into KingFisher Deepwell 96 Plate (Fisher Scientific, Cat. 95040450) and mixed with 500 µl of PBST (15 mM sodium phosphate pH 7.3, 150 mM NaCl, 0.05% Tween20 (v/v)) containing 4 mg/L DNase and 500 µM $MgSO_4$. Plate was transferred to magnetic particle processor (King Fisher 96, Thermo Scientific). 20 µl of Protein G coated magnetic beads (Millipore PureProteome, Cat. LSKMAGG10) were transformed into diluted supernatants and mixed in magnetic particle processor for 1 hour. Magnetic beads with Protein G captured recombinant antibodies were subsequently washed in magnetic bead processor for 10 seconds in 300 µL PBST and transferred to 1% DMSO (v/v) PBST containing 1 µM of mycophenolic acid, L-thyroxine, Ochratoxin A, Aflatoxin B1 and HT2-toxin. After 30 minutes of incubation with constant shaking beads were washed as above and transferred to 100 µl of 100% methanol containing 40 ng/mL Zearalane, in which Zearalane serves as a normalization standard for MS-analyses. Beads were mixed in methanol for 30 minutes to remove analytes from bound antibodies. Magnetic beads were then collected and 100% methanol solution now containing analytes were diluted 1:1 in double distilled water (DDIW).

Figure 2:
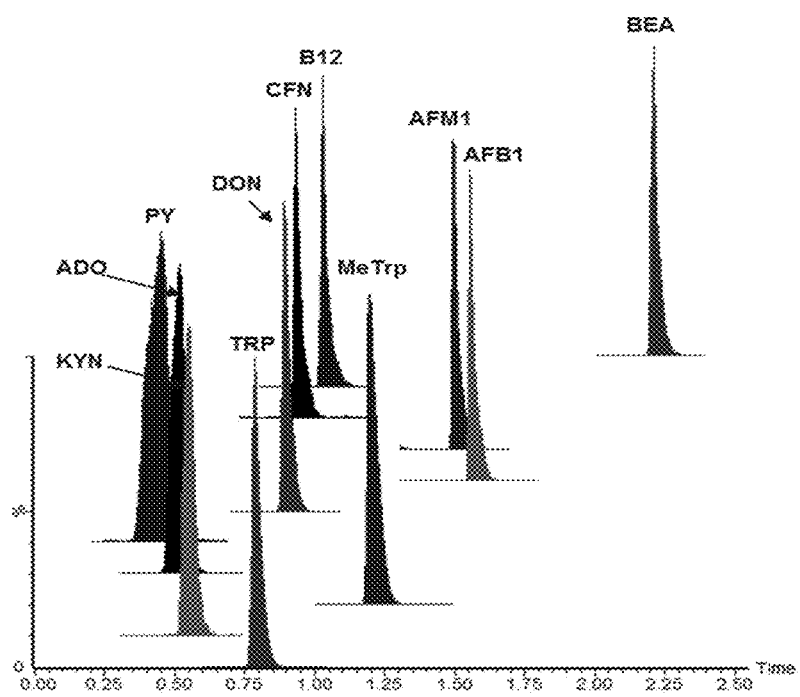
FIG. 2 shows results of UPLC-MS/MS separation of a standard solution. The extracted ion chromatograms of SRM transitions in one run are overlaid. See abbreviations and MS conditions in Table 4.

The analyses were performed by a UPLC-MS/MS system consisting of an Acquity UPLC (Waters, Milford, MA) instrument equipped with a sample organizer and coupled to a Xevo TQ-S tandem quadrupole mass spectrometer (Waters, Milford, MA). A short analytical column, an Acquity UPLC BEH C18, 2.1 mm×30 mm (1.7 µm particle size) and gradient elution with water and methanol containing 0.1% formic acid and 5 mM ammonium acetate were utilized for a fast chromatographic separation of the target molecules. Mass spectrometry was performed using ESI in positive ion mode and the MS parameters for each SRM were optimized. The more detailed MS parameters are presented in Table 4 (See also FIG. 2). The data was collected and processed using TargetLynx software (Waters). Analytes were quantified by internal standard method and the quantitation limits were in the pg/ml to ng/mL range depending on compound. Repeatability of the method was monitored by analyzing several control samples together with each set of sample plates.

Results of the analysis are shown in Table 3.

TABLE 3

The method of the present invention is able to reveal antibody fragments, which bind target molecules of interest.

| The known Fab fragment antibody in the mixture | Colonies (total) | AFB1 ng/mL | MPA ng/ML | HT-2 ng/mL | OTA ng/mL | T4 ng/ML |
|---|---|---|---|---|---|---|
| anti-aflatoxin B1 | 10 | 4.19 | 0.37 | 0.10 | 0.98 | 1.86 |
| anti-aflatoxin B1 | 10 | 4.67 | 0.43 | 0.10 | 1.14 | 1.90 |
| anti-mycophenolic acid | 10 | 0.47 | 0.84 | 0.10 | 1.27 | 1.86 |
| anti-mycophenolic acid | 10 | 0.52 | 0.60 | 0.10 | 1.43 | 2.50 |
| anti-Ochratoxin B | 10 | 0.51 | 0.50 | 0.10 | 1.83 | 3.53 |
| anti-Ochratoxin B | 10 | 0.59 | 0.56 | 0.10 | 2.60 | 4.29 |
| anti-L-thyroxine | 10 | 0.45 | 0.44 | 0.10 | 1.39 | 28.30 |
| anti-L-thyroxine | 10 | 0.50 | 0.47 | 0.10 | 1.49 | 30.10 |

TABLE 4

SRMs (precursor and product ions), cone voltages, collision energies and retention times of the studied molecules.

| Analyte | Abbreviation | Precursor ion (m/z) | Product ion (m/z) | Cone (V) | Collision energy (eV) | rt (min) |
|---|---|---|---|---|---|---|
| Psilocybin | PY | 285.0 | 205.0 | 30 | 15 | 0.45 |
| Adenosine | ADO | 268.2 | 136.1 | 20 | 23 | 0.52 |
| Kynurenine | KYN | 209.0 | 146.0 | 20 | 26 | 0.55 |
| Tryptophan | TRP | 205.0 | 146.0 | 20 | 25 | 0.79 |
| Cefalonium | CFN | 459.3 | 152.0 | 18 | 18 | 0.93 |
| Deoxynivalenol | DON | 297.1 | 249.1 | 17 | 10 | 0.89 |
| Vitamin B12 | B12 | 678.4 | 359.3 | 20 | 20 | 1.03 |
| Methyl Tryptophan | MeTrp (=ISTD) | 219.0 | 160.0 | 20 | 25 | 1.21 |
| Aflatoxin B1 | AFB1 | 313.1 | 241.1 | 36 | 36 | 1.55 |
| Aflatoxin M1 | AFM1 | 329.0 | 273.0 | 36 | 36 | 1.49 |
| Beauvericin | BEA | 784.2 | 243.9 | 48 | 28 | 2.21 |

The invention claimed is:

1. A method of screening a polypeptide capable of binding a target molecule, wherein the method comprises
   i) allowing a capture complex to contact with the polypeptide thereby forming a first complex comprising the capture complex and the polypeptide,
   ii) allowing the first complex to contact with a sample comprising target molecules thereby forming a second complex comprising the capture complex, the polypeptide, and a target molecule, and
   iii) separating the target molecule of the second complex to a solution, or
   i) allowing a polypeptide to contact with a target molecule thereby forming a first complex comprising the polypeptide and the target molecule,
   ii) allowing the first complex to contact with a capture complex thereby forming a second complex comprising the capture complex, the polypeptide, and the target molecule, and
   iii) separating the target molecule of the second complex to a solution, wherein the polypeptide is an antibody or an antigen binding fragment thereof and the target molecule is a free and intact organic small molecule, wherein the target molecule is not modified with a linker.

2. The method of claim 1, wherein the method comprises determining whether the second complex has been formed before separating the target molecule of the second complex to the solution.

3. The method of claim 1, wherein the solution is selected from the group consisting of methanol, ethanol and acetonitrile, and any combination thereof, and any water solution thereof.

4. The method of claim 1, wherein the method further comprises analyzing the target molecule separated to the solution.

5. The method of claim 4, wherein analyzing is carried out by a mass spectrometer, detection methods including enzymatic assays, immunological detection methods, fluorescent methods, any instrumental analytical method sensitive for small size molecules, or any combination thereof.

6. The method of claim 1, wherein the capture complex comprises a magnetic bead.

7. The method of claim 1, wherein the method further comprises recovering and/or determining the polypeptide capable of binding the target molecule present in the first or second complex.

8. The method of claim 1, wherein the first and/or second complexes are formed in one or more wells, multi-well plates, tubes, vials, vessels or any combination thereof.

9. The method of claim 1, wherein steps i)-iii) are carried out in at least one well, multi-well plate, tube, vial, vessel or any combination thereof.

10. The method of claim 1, wherein the first complex is captured to a solid surface before step ii).

11. The method of claim 1, wherein one or more washing steps are carried out after step i) or capturing the first complex in claim 10 for removing unbound polypeptides and/or target molecules, and/or one or more washing steps are carried out after step ii) for removing unbound target molecules, polypeptides or capture complexes.

12. The method of claim 1, wherein the method further comprises production of the polypeptide capable of binding the target molecule.

13. The method of claim 1, wherein the method further comprises in vitro production of the polypeptide or growing a cell or clone under conditions permitting production of the polypeptide for step i), optionally in the same well, tube, vial or vessel, wherein steps i)-iii) are carried out.

14. The method of claim 1, wherein the method is a screening method of recombinant polypeptides or polypeptide libraries against target molecules.

15. The method of claim 1, wherein the capture complex (es) or target molecule(s) is (are) allowed to contact with 1-100 polypeptides, cells or clones in one well, tube, vial or vessel.

16. The method of claim 13, wherein the cell is selected from the group consisting of a bacteria cell, *Escherichia coli* cell, eukaryotic cell, insect cell, yeast cell, fungal cell, filamentous fungal cell, and mold cell; or the clone is selected from the group consisting of a clone of bacterial cells, *Escherichia coli* cells, eukaryotic cells, insect cells, yeast cells, fungal cells, filamentous fungal cells, and mold cells.

17. The method of claim 13, wherein in vitro productions, cells or clones from a well, tube, vial or vessel comprising polypeptides bound to target molecules are plated and screened for determining the single in vitro production, cell or clone capable of producing the polypeptide capable of binding the target molecule of interest.

18. The method of claim 1, wherein there are 1-100 different target molecules present in the sample.

19. The method of claim 1, wherein the target molecule is selected from the group consisting of neurotransmitters, hormones, vitamins, metabolites, toxins, mycotoxins, bacterial toxins, pesticides, herbicides, antibacterial compounds, antibiotics, marine toxins, flame retardants, endocrine disrupting compounds, biocides, halogenated compounds, pharmaceuticals, illegal and design drugs of abuse.

20. The method of claim 1, wherein the method is a high-throughput method.

21. A complex comprising a capture complex bound to a polypeptide bound to a target molecule, wherein the polypeptide is an antibody or an antigen binding fragment thereof and the target molecule is a free and intact organic small molecule, wherein the target molecule is not modified with a linker.

22. A kit for carrying out the method of claim 1, comprising i) the capture complex for binding the polypeptide and for forming the first complex comprising the capture complex and the polypeptide or the second complex comprising the capture complex, the polypeptide, and the target molecule, ii) the polypeptide for binding the target molecule and for forming the first complex comprising the polypeptide and the target molecule or the second complex comprising the capture complex, the polypeptide, and the target molecule, and/or target molecules for forming the first or second complex, and iii) the solution for separating the target molecule of the second complex, wherein the polypeptide is the antibody or antigen binding fragment thereof and the target molecule is the free and intact organic small molecule, wherein the target molecule is not modified with a linker.

23. The kit of claim 22, wherein the kit further comprises one or more reagents for performing the method of screening the polypeptide capable of binding the target molecule, and optionally instructions for performing the method of screening the polypeptide capable of binding the target molecule and/or analyzing the target molecule.

* * * * *